Feb. 3, 1970    D. L. DEWHIRST ET AL    3,493,027
DEFORMABLE VEHICLE WHEEL

Filed May 20, 1966    3 Sheets-Sheet 1

INVENTORS
CALVIN V. KERN
DONALD L. DEWHIRST

BY James L. O'Brien

ATTORNEY

Feb. 3, 1970  D. L. DEWHIRST ET AL  3,493,027
DEFORMABLE VEHICLE WHEEL

Filed May 20, 1966  3 Sheets-Sheet 2

INVENTORS
CALVIN V. KERN
DONALD L. DEWHIRST

BY James L. O'Brien

ATTORNEY

Feb. 3, 1970   D. L. DEWHIRST ET AL   3,493,027
DEFORMABLE VEHICLE WHEEL
Filed May 20, 1966  3 Sheets-Sheet 3
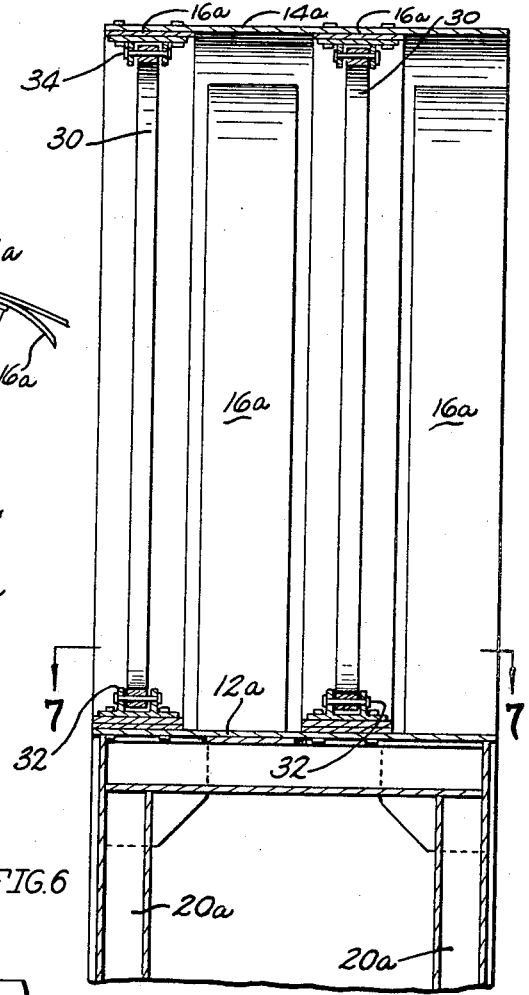
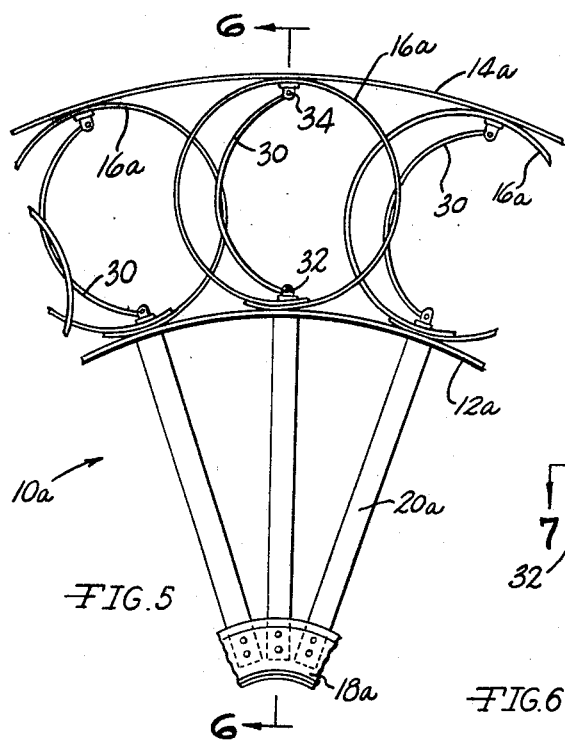
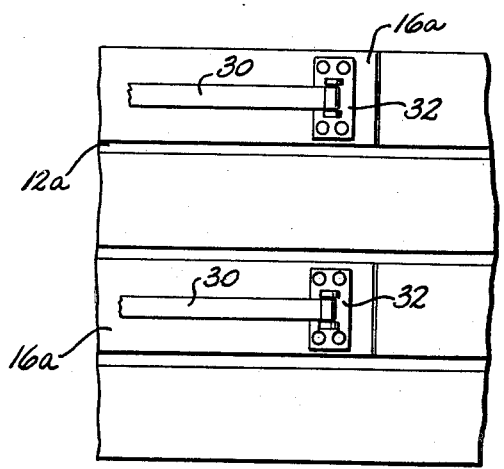
INVENTORS
CALVIN V. KERN
DONALD L. DEWHIRST
ATTORNEY

# United States Patent Office 3,493,027
Patented Feb. 3, 1970

3,493,027
DEFORMABLE VEHICLE WHEEL
Donald L. Dewhirst, Ann Arbor, and Calvin V. Kern, South Lyon, Mich., assignors, by mesne assignments, to the United States of America as represented by the National Aeronautics and Space Administration
Filed May 20, 1966, Ser. No. 551,694
Int. Cl. B60b 9/00
U.S. Cl. 152—11                    3 Claims

ABSTRACT OF THE DISCLOSURE

A deformable vehicle wheel capable of travel on lunar surfaces having a flexible outer rim joined to a hub by a plurality of resilient ring shaped members in a manner such that the ring members are resiliently deformable in the radial direction to allow relative movement between the rim and the hub in the radial direction and yet provide resistance to relative movement between the rim and the hub in the axial direction.

---

This invention relates generally to vehicle wheels and more particularly to an improved vehicle wheel which can withstand extreme environment such as that found on the moon.

Situations now exist in which a vehicle wheel which can withstand extreme temperature, ultra high vacuum, and space radiation conditions, but which has resilient support and mobility capabilities comparable to the well known wheel and pneumatic rubber tire assembly, is desirable. Such a wheel is particularly desirable in a lunar vehicle which must be operated in an extraterrestial environment. It is an object of this invention, therefore, to provide an improved vehicle wheel which incorporates the above-described desirable characteristics.

A vehicle wheel capable of travel on lunar surfaces must be constructed so as to avoid rubbing surfaces which tend to cold weld in the temperature and vacuum environment on the moon. For this reason, caterpillar treads, which require hinge pins between the links, and endless belt-type tracks, which require roller supports, are believed to be unsatisfactory. The wheel must also provide resilient support for the vehicle both for shock absorbing purposes and for the purpose of adapting the footprint or tread area of the wheel to the characteristics of the supporting soil. In the wheel of this invention, a single hub is required which can be sealed and put under pressure, so as to avoid cold weld problems, and an outer rim is supported at its inner periphery on flexible rings arranged in a circular formation so that the rim can adapt to supporting soil characteristics.

Further objects, features and advantages of this invention will become apparent from a consideration of the following description, the appended claims, and the accompanying drawing in which:

FIGURE 5 is a fragmentary side elevational view of a portion of another form of the wheel of this invention;

FIGURE 6 is an enlarged transverse sectional view of the wheel shown in FIG. 5, looking substantially along the line 6—6 in FIG. 5; and FIGURE 7 is a detail sectional view of a portion of the wheel of FIG. 5, as seen from substantially the line 7—7 in FIG. 6.

Figure 1:
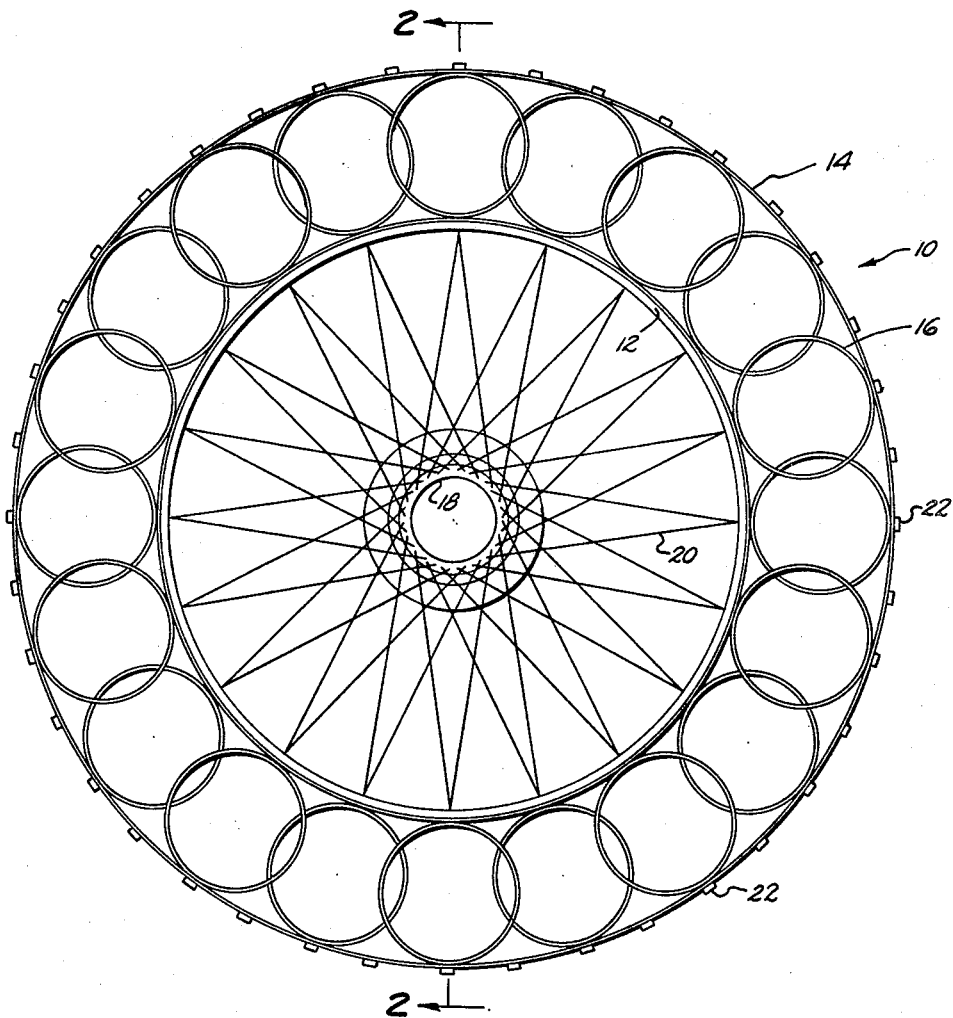
FIGURE 1 is a side elevational view of one form of the vehicle wheel of this invention.

With reference to the drawing, the wheel of this invention, indicated generally at 10, is illustrated in FIG. 1 as including an annular inner rim 12 and an annular outer rim 14. In the embodiment of the invention shown in FIG. 1, the inner rim 12 is sufficiently strong and is of a sufficient size to impart substantial rigidity to the rim 12 so that it will not deflect noticeably under anticipated loads. In the embodiment of the invention shown in FIGS. 5–7, the inner rim 12 is flexible and acts as a membrane. The outer rim 14 is relatively thin and flexible and is disposed concentrically about the inner rim 12 when the wheel 10 is not under load, as shown in FIG. 1. The outer rim 14 is formed of titanium which has high elastic strain qualities, is relatively flexible, of low density, and is little affected by temperature extremes. The inner rim 12, when the wheel 10 is constructed so that the rim 12 is relatively rigid, as in FIG. 1, can be made of aluminum since it does not have to flex. In one embodiment of the invention, the outer rim 14 is about .015" thick so that it can yield under load.

The wheel 10 includes a hub 18 shaped for mounting on an axle (not shown) and a plurality of wire spokes 20 which are secured to the hub 18 and extend radially outwardly therefrom. At their outer ends, the spokes 20 are attached to the inner rim 12.

Figure 4:
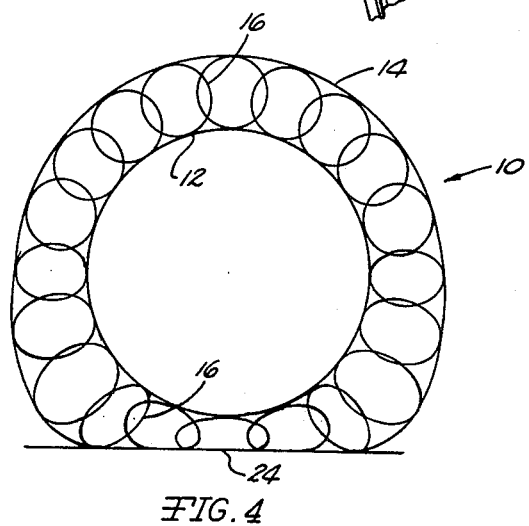
FIGURE 4 is a diagrammatic side view of the wheel of this invention, showing the wheel in a loaded position.

A plurality of resilient ring shape members 16 of uniform size are disposed between and connected at their peripheries to the inner rim 12 and the outer rim 14. The ring members 16 are sufficiently resilient in a direction radially of the wheel 10, to allow for movement of the bottom side of the outer rim 14 toward the hub 18 when the wheel 10 is supporting a load as shown in FIG. 4. At the same time the ring members 16 at the top side of the outer rim 14 are pulling the outer rim 14 radially inwardly. When the wheel 10 is not under load, the ring members 16 maintain the outer rim 14 in a predetermined spaced relation with the inner rim 12. The purpose of the ring members 16 is to impart a hardening spring action to the outer rim 14 so that at the area of loading of the outer rim 14, the rim 14 resiliently deflects within limits proportional to the magnitude of the load. The ring members 16 provide the wheel 10 with the desired resilience in a radial direction for shock absorbing and footprint purposes, and in adidtion impart a desired resistance to torsional loading as well as lateral thrust.

Figure 2:
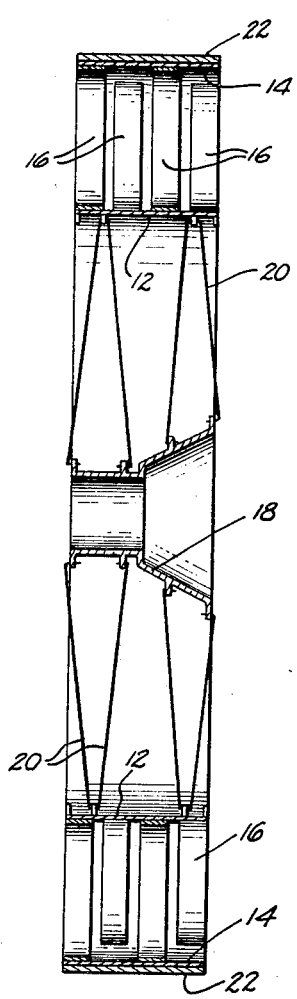
FIGURE 2 is a transverse sectional view of the wheel of this invention as seen from substantially the line 2—2 in FIG. 1.
Figure 3:
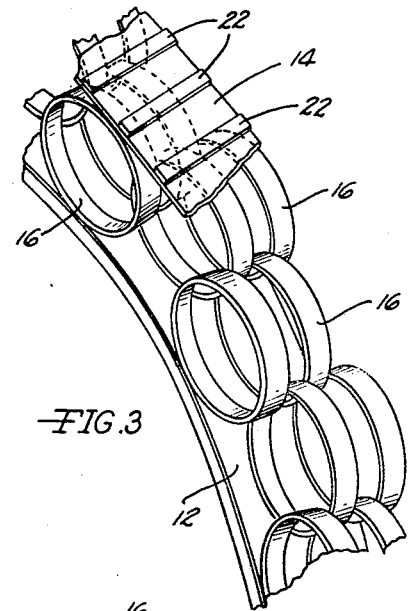
FIGURE 3 is a fragmentary perspective view of a portion of the wheel of this invention.

The resilient ring members 16 are overlapped, as shown in FIGS. 1 and 3, and are arranged side-by-side in rows extending about the inner circumference of the outer rim 14. As shown in FIG. 2, the rims 12 and 14 are of equal width sufficient to confine the rings 16 therebetween, and the rings 16 are also of substantial width. The rings 16 are preferably formed of .060" titanium and a spoke 20 is secured to the inner rim 12 at each area of connection of a ring 16 to the rim 12 so as to preclude any sharp bends in the rim 12 or the rings 16 when the wheel 10 is loaded. The inner rim 12 thus also functions to transfer loads between spokes 20 so that the spokes 20 can be kept of minimum size.

To improve the traction of the wheel 10, the ring 14 can be provided on its radially outer side with spaced tread members 22 or the outer surface of the rim 14 can be roughened.

Another form of the vehicle wheel of this invention, indicated generally at 10a, is illustrated in FIGS. 5–7, inclusive. Since the wheel 10a is similar in many respects to the wheel 10 described above, like numerals with the letter suffix "a" are used on the wheel 10a to designate like parts on the wheel 10. The wheel 10a includes an axial hub 18a, and outwardly radiating spokes 20a which, in this form of the invention, are tubular columns seured at their inner ends to the hub 18a. At their outer nds, the columns 20a are secured to a relatively thin nd flexible inner rim 12a. An outer rim 14a, identical ) the rim 14 in the wheel 10, is disposed concentrically bout the inner rim 12 when the wheel 10a is not under )ad. Annular ring members 16a are positioned between 1e inner and outer rims 12a and 14a, respectively, and re secured at their outer peripheries to both the rim 12a nd the rim 14a. Importantly, in the wheel 10a, the rings 6a are secured to the inner rim 12a at points adjacent ) the points of attachment of the tubular columns 20a ) the rim 12a, as shown in FIG. 5.

It can thus be seen that in the wheel 10a, the inner im 12a acts as a flexible membrane attached to rigid ubular columns 20a so that the inner ring 12a functions ) support the flexible ring members 16a in a manner uch that when they deflect as shown in FIG. 4, the ing members 16a bend over a curvature defined by the nner rim 12a and do not bend sharply over the ends if the columns 20a.

The wheel 10a also includes a plurality of retention traps 30 which are arranged in pairs in a direction trans- 'ersely of the wheel 10a as shown in FIGS. 6 and 7. Each retention strap 30 is of a bowed construction and s secured at its inner end by a pivot bracket 32 to the nner rim 12a and at its outer end by a second pivot )racket 34 to the outer rim 14a. The purpose of the reention straps 30 is to prevent the resilient ring mem)ers 16a from being unduly deformed when disposed it what is termed the lower corners of the wheel 10a when the wheel is loaded as shown in FIG. 4. The reention straps 30 are particularly effective to prevent stretching or undue deformation of the ring members 16a when the wheel 10a is in torsion, such as when starting or stopping rotation of the wheel 10a.

It can thus be seen that in both the wheels 10 and 10a in outer flexible rim is mounted on resilient ring mem)ers which are in turn connected to a hub. In the wheel 10, the connection is in the form of a rigid inner rim 12 mounted on small spokes 20. In the wheel 10a, the connection is in the form of a flexible rim or membrane 12a mounted on rigid spokes or columns 20a. In both wheels, the flexible outer rim and the ring members cooperate to provide for a radially deformable wheel having the desired shock absorbing and traction capabilities as well as resistance to torsional loading and lateral thrust.

In the use of either of the wheels 10 and 10a of this invention, when the wheel is loaded, by mounting it in a supporting relation with a vehicle (not shown) the resilient members 16 at the bottom of the wheel deflect or compress sufficiently, as shown in FIG. 4, to provide a substantially flat traction area 24 at the bottom of the wheel comparable to that provided by the pneumatic tires in conventional wheel and tire assemblies. As shown in FIG. 4, the yielding of the resilient members 16 is progressively increased in a direction toward the bottom of the wheel so as to provide for a resilient support of the vehicle while still accomplishing the desired traction area 24. As the wheel is loaded, the ground contact area 24 increases so that the critical pressure of the lunar soil is not exceeded. Also, by virtue of the support of the outer rim 14 on the ring members 16 which are secured to the hub 18 by the spokes 20, the wheel resists the lateral thrust encountered on side hills and when turning a corner. Accordingly, the wheel of this invention is provided with the necessary soft soil and slope climbing capabilities which will enable a vehicle supported thereon to travel over varied terrains, and the wheel is usable in extreme temperature situations since the parts thereof are substantially unaffected by temperature, vacuum and radiation extremes. The desirability and varied uses for such a wheel are believed to be manifest.

It will be understood that the vehicle wheel which is herein disclosed and described is presented for purposes of explanation and illustration and is not intended to indicate limits of the invention, the scope of which is defined by the following claims.

We claim:

1. A vehicle wheel comprising hub means, a flexible continuous rim arranged in a substantially concentric relation with and extending about said hub means in a spaced relation with said hub means, a plurality of resilient ring shaped members extending about the inner periphery of said rim and fixedly connected thereto to prevent sliding engagement therewith, connecting means extending between said ring members and said hub so as to maintain said ring members in a predetermined spaced relation with said hub means, each of said ring members being resistant to deformation in a direction axially of said rim to provide resistance to axial deformation of said rim with respect to said hub means and being resiliently deformable in a direction radially of said rim sufficiently to allow movement of said rim toward said hub means in a radially inward direction and increased non-sliding engagement of said ring members with said rims and corresponding increased support of said rim by said ring members in response to loads on said rims tending to move said rim in said direction, and a plurality of retention straps connected to and extending between the inner periphery of said rim and said connecting means so as to limit the deformation of said ring members.

2. A vehicle wheel according to claim 1 in which said connecting means includes a second flexible rim disposed within and spaced from said first mentioned flexible rim, said second rim being secured to the periphery of said ring members, and rigid column means connected to said hub means for supporting said second flexible rim in substantially fixed concentric relation with said hub means, said retention straps being connected to and extending between radially aligned points on said rim.

3. A method for axially and laterally supporting a flexible continuous vehicle wheel rim on a hub without interface adhesion between the rim and the supporting structure in a high vacuum environment comprising the steps of, fixedly connecting a plurality of resilient ring spaced members about the inner periphery of said rim to prevent sliding engagement therewith, and connecting the ring members and the hub so as to maintain the ring members in a predetermined spaced relationship with the hub, each of the ring members being resistant to deformation in a direction axially of said rim to provide resistance to axial deformation of the rim with respect to the hub and being resiliently deformable in a direction radially of the rim sufficiently to allow movement of the rim toward the hub in a radially inward direction and increased non-sliding engagement of the ring members with the inner periphery of a rim and corresponding increase support of the rim by the ring members in response to loads on said rim tending to move the rim in the radially inward direction.

References Cited

UNITED STATES PATENTS

| 1,451,517 | 4/1923 | Smith | 152—11 |
| 1,469,867 | 10/1923 | Young | 152—8 |
| 2,912,032 | 11/1959 | Alexander | 152—6 |
| 3,058,508 | 10/1962 | Wallace | 152—5 |

FOREIGN PATENTS

| 1,849 | 1858 | Great Britain. |
| 19,112 | 1891 | Great Britain. |
| 120,930 | 8/1930 | Austria. |

ARTHUR L. LA POINT, Primary Examiner